US012192578B2

(12) United States Patent
Krishnamoorthi et al.

(10) Patent No.: US 12,192,578 B2
(45) Date of Patent: Jan. 7, 2025

(54) METHODS AND SYSTEMS TO PROVIDE A PLAYLIST FOR SIMULTANEOUS PRESENTATION OF A PLURALITY OF MEDIA ASSETS

(71) Applicant: Adeia Guides Inc., San Jose, CA (US)

(72) Inventors: Santhiya Krishnamoorthi, Bangalore (IN); Ramesh Arsam, Telangana (IN); Padmassri Chandrashekar, Karnataka (IN); Daina Emmanuel, Bangalore (IN); Jayshil Parekh, Karnataka (IN); Harshavardhan Reddy Kalathuru, Andhra Pradesh (IN); Vaibhav Gupta, Karnataka (IN); Ashish Gupta, Karnataka (IN); Senthil Kumar Karuppasamy, Bangalore (IN); Anil Kumar, Haryana (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/134,230

(22) Filed: Apr. 13, 2023

(65) Prior Publication Data

US 2023/0328320 A1 Oct. 12, 2023

Related U.S. Application Data

(63) Continuation of application No. 17/478,526, filed on Sep. 17, 2021, now Pat. No. 11,659,243.

(51) Int. Cl.
*H04N 21/45* (2011.01)
*H04N 5/45* (2011.01)
(Continued)

(52) U.S. Cl.
CPC ........... *H04N 21/4532* (2013.01); *H04N 5/45* (2013.01); *H04N 21/2187* (2013.01);
(Continued)

(58) Field of Classification Search
CPC .. H04N 21/4532; H04N 5/45; H04N 21/2187; H04N 21/4316; H04N 21/4394;
(Continued)

(56) References Cited

U.S. PATENT DOCUMENTS 7,761,892 B2 7/2010 Ellis et al.
10,362,344 B1 7/2019 Yan et al.
(Continued)

FOREIGN PATENT DOCUMENTS

WO 2013070177 A1 5/2013

OTHER PUBLICATIONS

U.S. Appl. No. 17/478,473, filed Sep. 17, 2021, Harshavardhan Reddy Kalathuru.

(Continued)

*Primary Examiner* — Alazar Tilahun
(74) *Attorney, Agent, or Firm* — Haley Guiliano LLP

(57) ABSTRACT

Systems and methods are described herein for generating a playlist for a simultaneous presentation of a plurality of media assets. The system retrieves a user preference associated with a user profile and receives a selection of a first media asset and a second media asset from the plurality of media assets for presentation on a user device. The system parses the respective audio streams of the first media asset and the second media asset to identify one or more preferred audio segments based on the user preference and generates the playlist of the identified one or more preferred audio segments. Based on a generated audio playlist, the system generates, for presentation on the user device, the video stream for each of the first media asset and the second media asset and the playlist of the identified one or more preferred audio segments.

20 Claims, 11 Drawing Sheets

(51) Int. Cl.
*H04N 21/2187* (2011.01)
*H04N 21/431* (2011.01)
*H04N 21/439* (2011.01)
*H04N 21/442* (2011.01)
*H04N 21/482* (2011.01)
*H04N 21/488* (2011.01)
*H04N 21/84* (2011.01)

(52) U.S. Cl.
CPC ..... *H04N 21/4316* (2013.01); *H04N 21/4394* (2013.01); *H04N 21/44209* (2013.01); *H04N 21/4825* (2013.01); *H04N 21/4884* (2013.01); *H04N 21/84* (2013.01)

(58) Field of Classification Search
CPC ......... H04N 21/44209; H04N 21/4825; H04N 21/4884; H04N 21/84
See application file for complete search history.

(56) References Cited

U.S. PATENT DOCUMENTS

| | | |
|---|---|---|
| 11,109,101 B1 | 8/2021 | Binder et al. |
| 2003/0179283 A1 | 9/2003 | Seidel et al. |
| 2006/0217966 A1 | 9/2006 | Hu et al. |
| 2008/0263590 A1 | 10/2008 | Iki et al. |
| 2008/0282287 A1* | 11/2008 | Chen ............... G11B 27/034 725/37 |
| 2009/0037966 A1 | 2/2009 | Rolls et al. |
| 2010/0333143 A1 | 12/2010 | Civanlar et al. |
| 2014/0139742 A1 | 5/2014 | Krishna et al. |
| 2015/0350717 A1 | 12/2015 | Pantos et al. |
| 2016/0309212 A1 | 10/2016 | Martch et al. |
| 2017/0001111 A1 | 1/2017 | Willette et al. |
| 2017/0006322 A1 | 1/2017 | Dury et al. |
| 2017/0272808 A1 | 9/2017 | Richman et al. |
| 2017/0339204 A1 | 11/2017 | Tang et al. |
| 2019/0394535 A1 | 12/2019 | Panchaksharaiah et al. |
| 2020/0045385 A1* | 2/2020 | Packard ............. H04N 21/8549 |
| 2023/0088988 A1 | 3/2023 | Krishnamoorthi et al. |
| 2023/0091730 A1 | 3/2023 | Kalathuru et al. |
| 2023/0093416 A1 | 3/2023 | Kumar et al. |

OTHER PUBLICATIONS

U.S. Appl. No. 17/478,538, filed Sep. 17, 2021, Anil Kumar.
International Search Report and Written Opinion of PCT/2022/076552 dated Jan. 5, 2023.

* cited by examiner

1100 ⬅

EXTM3U
EXT-X-VERSION:6
EXT-X-INDEPENDENT-SEGMENTS

EXT-X-MERGED-CH1CH2

EXT-X-STREAM-INF:AVERAGE-
BANDWIDTH=2168183,BANDWIDTH=2177116,CODECS="avc1.640020,mp4a.40.2",RESOLUTION=960x540,FRA
ME-RATE=60.000,CLOSED-CAPTIONS="cc1",AUDIO="aud1",SUBTITLES="sub1"
v5/prog_index.m3u8
EXT-X-STREAM-INF:AVERAGE-
BANDWIDTH=7968416,BANDWIDTH=8001098,CODECS="avc1.64002a,mp4a.40.2",RESOLUTION=1920x1080,F
RAME-RATE=60.000,CLOSED-CAPTIONS="cc1",AUDIO="aud1",SUBTITLES="sub1"
v9/prog_index.m3u8
EXT-X-STREAM-INF:AVERAGE-
BANDWIDTH=7968416,BANDWIDTH=8001098,CODECS="avc1.64002a,mp4a.40.2",RESOLUTION=1920x1080,F
RAME-RATE=60.000,CLOSED-CAPTIONS="cc1",AUDIO="aud1",SUBTITLES="sub1"
/combinedAudio.m3u

FIG. 11

METHODS AND SYSTEMS TO PROVIDE A PLAYLIST FOR SIMULTANEOUS PRESENTATION OF A PLURALITY OF MEDIA ASSETS

CROSS REFERENCE TO RELATED APPLICATIONS

This application is a continuation of U.S. patent application Ser. No. 17/478,526, filed Sep. 17, 2021, the disclosures of which is hereby incorporated by reference herein in its entirety.

BACKGROUND

The present disclosure relates to methods and systems for consuming multiple media assets and, more particularly, to methods and systems for generating a combined audio stream based on user preferences from the multiple media assets for presentation on a consumer device. In another example, the present disclosure is directed to methods and systems for identifying events within a media asset and proposing to present the event on display.

SUMMARY

Users often enjoy experiencing multiple media assets, such as watching multiple football games on television; however it requires switching back and forth between channels. This becomes more of a challenge with the wide availability and selection of digital content, combined with a large number of electronic devices available for its playback, meaning that consumers may select and play multiple media assets on several screens of a display or on multiple displays. This allows users great flexibility in where and how they may view their content. Some users may stream multiple media assets on a single device with multiple screens simultaneously. In some scenarios, viewers may wish to view a first media asset and listen to a second media asset. In other scenarios, viewers may wish to view two different media assets and listen to a third media asset. In yet other scenarios, viewers may wish to view certain media assets while listening to other media assets. Often, viewers need to select a media asset to listen to and media assets to view. In a scenario where the viewer prefers to listen to parts of both media assets, the viewer needs to manually switch back and forth between the media assets, which may be laborious and inconvenient. In addition, when multiple media assets are available for display, it may be difficult to determine which audio from each media asset to present for the viewers. Providing a display with multiple media assets for viewers without requiring a viewer selection may improve a viewer's ability to access media, particularly for media that is important or interesting for the viewer.

In one scenario, "Multi-view" is a feature that is commonly used by some video providers to enable a user to watch multiple content items, e.g., sport games, simultaneously. For example, if "Dual-view" is enabled, then the user can watch two games side by side. Similarly, if "Thumbnail view" is enabled, then the user can watch multiple games, where a large video for one game is displayed, and the remaining games are shown on the side as small videos, or even a quad view—where all four videos are the same size. Watching multiple games at once can be inconvenient for some users and even distracting since a user can miss, for example, key moments or interesting plays in a game. Similarly, the client device might experience poor bandwidth connection, resulting in bad-quality video and causing frames to be dropped, particularly when other applications are running in the background.

The advancement of digital transmission of media content has increased the amount of data that can be transmitted. In particular, media systems may transmit metadata that includes detailed information about media content. This metadata may include descriptions and tags to events within the media asset. While this information, by itself, is not useable for displaying to a human user, computer processors can read and interpret this information. However, while computer processors may read and interpret this information and generate media content for display that may be useable by a human user (e.g., output media content on a display screen in a format recognizable to humans), these systems still fail to solve the problem of customizing which media asset to present to the viewer at a given moment. That is, as multiple media assets are identified as desired by the viewer, current systems lack the ability to detect specific triggers for when to switch between the various media assets to display for presentation based on the particular preference of the viewer.

In all of these scenarios, however, the ability to consume multiple different content streams concurrently is not without its difficulties. In particular, devices currently leave it to users to resolve their own conflicts, which can lead to excessive work and frustration. For instance, when users discover other content while listening to a podcast, they often want to pause the podcast while viewing the new content. In another example, when users consume multiple sporting events (e.g., a football game and a basketball game) simultaneously, the system may present the video of each sporting event but is limited in its ability to switch the audio between the sporting events. That is, users can switch back and forth in sporting events by simply switching which screen they are looking at. However, users currently must manually switch between the programs to listen to the audio from both programs. The need to manually implement media asset settings when multiple content streams are playing is, as above, a source of user frustration.

Accordingly, to overcome the problems and limitations of such services and their interfaces, systems and methods are described herein for a computer-based process that automatically determines when an individual is playing or requesting content playback on two different media assets, determines whether the two content streams present an audio conflict, and if so, resolves the conflict. Conflict resolution may be performed by, for instance, switching audio between the media assets or playing audio of one media asset and muting one of the media asset streams. If so, the conflict is automatically resolved. For example, if the system determines that a user is listening to a first media asset, the system recognizes that a conflict may exist with the audio of the second media asset and causes one of the audio streams to stop. However, if the system determines that the same user instead initiates a Ted Talk® video on a laptop, a conflict is deemed to occur, as people typically cannot pay full attention to each of two simultaneous audio tracks containing speech. Accordingly, the second media asset is automatically muted while its video continues. Other examples are further explained below.

In more detail, a list of users is maintained, and the system determines when a user on the list is playing a first media stream on a user device and requests a second media asset stream on the user device. When a user does so, the system then determines whether the audio segments (e.g., audio tracks) of the two content streams conflict. The system then determines which audio segment (e.g., audio tracks) to present during the presentation of the two media assets. In some embodiments, the audio may continuously switch back and forth between the two media assets. In yet another embodiment, the audio may be from a third media asset different from the two media assets being presented on a display of the user device. If no conflict is deemed to be present, both content streams are transmitted to the user device. For example, one of the audio streams may have minimal dialogue that does not interfere with the second audio stream. In another example, commercials line up in such a way that the system may switch back and forth between the two media assets between commercials. Conversely, if a conflict is deemed to occur, this conflict is resolved by muting or redirecting one of the audio content streams. Which audio content stream to mute or redirect is based on the user preferences (e.g., team, show, player or actor, etc.).

In some embodiments, methods and systems are disclosed for generating a playlist from a simultaneous presentation of a plurality of media assets. The system includes control circuitry configured to retrieve a user preference associated with a user profile. The system further includes input and output circuitry configured to receive a selection of a first media asset and a second media asset from the plurality of media assets for presentation on a user device. Each of the first media asset and the second media asset includes a video stream and an audio stream. The control circuitry then parses the respective audio streams of the first media asset and the second media asset to identify one or more preferred audio segments based on the user preference. The system then generates the playlist of the identified one or more preferred audio segments. Based on the generated playlist, the system then generates, for presentation on the user device, the video stream for each of the first media asset and the second media asset and the playlist of the identified one or more preferred audio segments. In some embodiments, the system generates the media assets for presentation simultaneously.

In some embodiments, the control circuitry generates the playlist of the identified one or more preferred audio segments by combining one or more preferred audio segments from the first media asset with one or more preferred audio segments from the second media asset. In some embodiments, the control circuitry generates the playlist of the identified one or more preferred audio segments by interleaving one or more first preferred audio segments and one or more second preferred audio segments to create a combined preferred audio stream. In some embodiments, the interleaving one or more first preferred audio segments and one or more second preferred audio segments to create the combined preferred audio stream includes arranging each of the one or more preferred audio segments of the first media asset and the second media asset in a sequence to create a storyline matching the user preference.

In some embodiments, the methods and systems disclosed propose enabling a parallel view of two channels either side by side or as picture-in-picture (PIP) based on the user's interest/preference for the mode and have the merged/combined audio for these two channels rendered.

In some embodiments, methods and systems are disclosed where the system, via a control circuitry, retrieves a user preference associated with a user profile. The system identifies, based on user preference, a plurality of media assets, for example, movies or shows the user prefers to watch based on viewer history. For display on the user device, the system then generates a first media asset of the plurality of media assets. For example, a first show is presented on the display. The system accesses metadata of a second media asset, to identify a segment of the second media asset including an event. The event may be identified based on the user's preference or metadata indicative of the importance of the event—for example, overtime of a favorite sport. The event may be based on the characters in the show. Based on the metadata, the system determines a playback time of the segment of the second media asset including the event. During the playback time of the segment of the second media asset including the event, the system generates for display on the user device the segment of the second media asset.

In some embodiments, the system performs an analysis of the second media asset. The analysis is selected from one or more of an object analysis, a frame analysis, a subtitle analysis, a speech analysis, and a natural language processing NLP analysis. The system compares each segment of the second media asset with user preferences. The system determines, based on the comparing, that a segment of the second media asset matches the user preferences. In some embodiments, the system generates for display, on the user device in a picture-and-picture mode, the segment of the second media asset.

In some embodiments, upon completion of the segment of the second media asset, the system automatically switches back to generating for display the first media asset.

In some embodiments, methods and systems are disclosed where the system may receive a request for a first media asset and a second media asset for presentation on a user device. Based on receiving the request, the system generates a user interface including a first screen configured for the presentation of the first media asset and a second screen configured for the presentation of the second media asset. For example, the display may include a split screen with one side playing a first movie and a second side playing a second movie. The system then processes an audio manifest for the first media asset and the second media asset. Each audio manifest includes a plurality of audio segments, each audio segment being associated with a priority rating. For example, the priority rating measures the importance of a segment or scene, where a segment in which a team scores or almost scores includes a higher priority rating as compared to other parts of a game. The system then compares the priority rating for each audio segment from the first media asset with the priority rating for each audio segment from the second media asset. Based on the comparing, the system generates a combined audio manifest with audio segments from the first media asset and the second media asset based on the audio segment having a higher priority rating. Subsequent to generating the combined audio, the system transmits for presentation on the user device a video stream of the first media asset on the first screen, a video of the second media asset on the second screen and the combined audio manifest.

In some embodiments, the system identifies a closed caption for each audio segment. The system then continues transmitting a closed caption for each audio segment determined to have a lower priority rating for presentation on the user device. In some embodiments, the system generates a combined audio manifest in a user enable mode. For example, the user enables the mode for dual or multi content consuming, and a manifest includes both the audio and the closed caption of both media assets It should be noted that the systems, methods, apparatuses, and/or aspects described above may be applied to or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 shows an illustrative diagram of a homogeneous audio combiner exemplary signaling mechanism, in accordance with some embodiments of the disclosure.

DETAILED DESCRIPTION

Systems and methods are provided herein to improve and alleviate bandwidth constraints on the many media assets being consumed in multi-view modes or various other modes where multiple media assets are consumed simultaneously. In some embodiments, a "multi-view" service (e.g., cloud-based) dynamically creates (e.g., instantiates) one or more additional video players and dynamically dismantles at least one video player, based on multiple factors, such as network conditions, user preferences for content (e.g., sports, teams, etc.), and real-time events (e.g., a potential play in a sports game that can result in a lead or score change—red zone play, etc.). Video players include a manifest of a media asset including video stream and audio stream and associated metadata for the media asset. The dynamic multi-view interface can play (e.g., toggle through) various portions of different live games in a single interface/video player based on an excitement score associated with a given game at that time. For example, there might be two different NFL games available for streaming—however, an important or exciting play may be happening in Game A, while there's no real action occurring in other games that the user "subscribes to" to receive updates on. In such a case, the live video of Game A is played back. However, if there are multiple potentially exciting plays occurring in two or more games, then the multi-view interface is dynamically expanded to show a live stream of the other games. For example, if two games need to be presented, then the multi-view switches to a "dual-view" to present the two games side by side. In such a scenario, the system instantiates a second video player and assigns the stream of the second game to the second player. Similarly, if the system determines that three games (Games A, B, and C) need to be displayed, then the multi-view service instantiates two video players and assigns the streams associated with games B and C to those video players. The size of the video players can be fixed according to a predetermined configuration or dynamically changed based on the excitement factor or type of play. For example, a game where a play in the end zone is taking place might be emphasized by getting displayed in a player that is larger in size than the other player(s).

Figure 1:
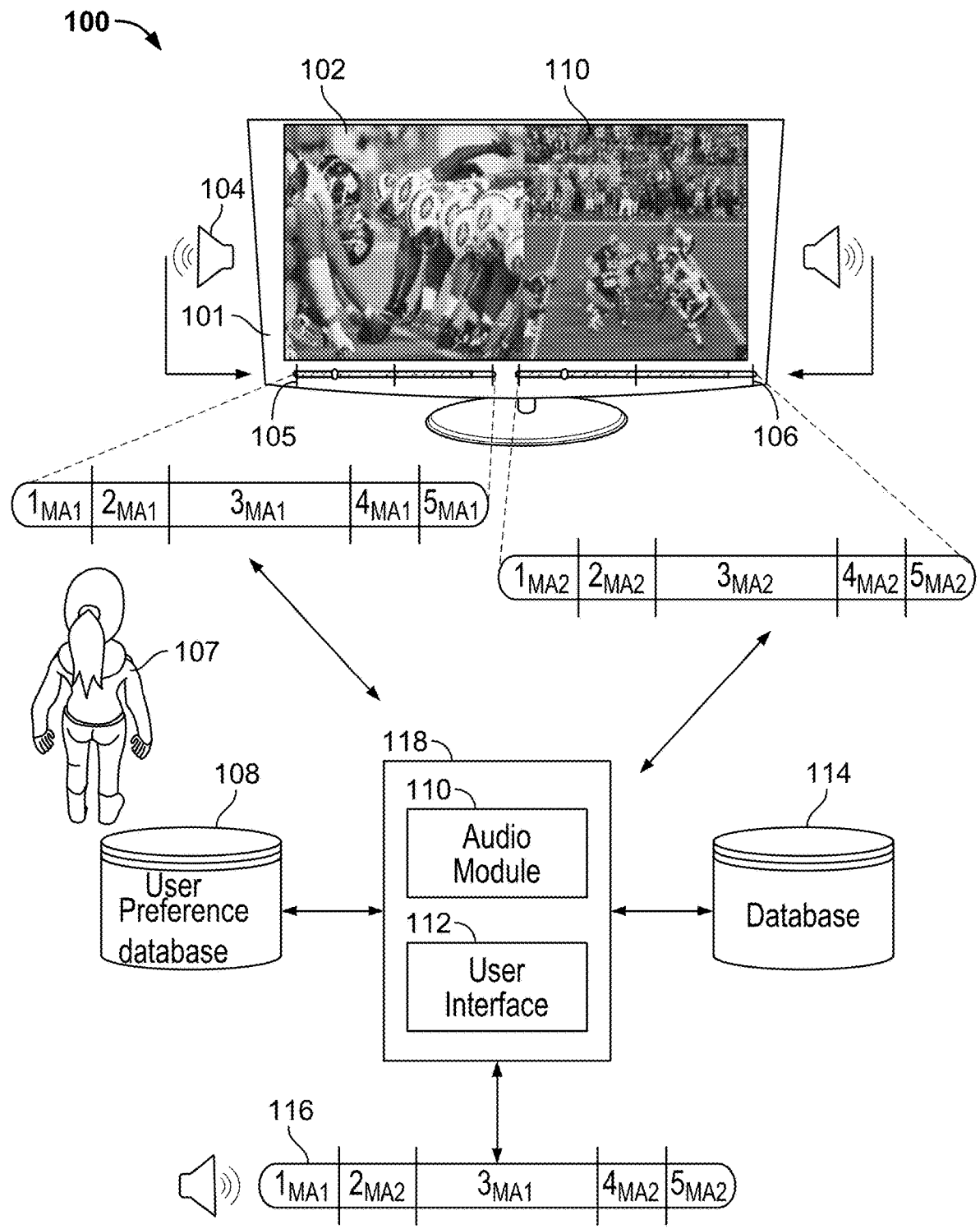
FIG. 1 shows an exemplary scenario 100 in which multiple audio sounds are identified from a plurality of media assets to be combined for presentation on a user device, according to some embodiments of the disclosure.

FIG. 1 shows an exemplary scenario 100 in which multiple audio sounds are identified from a plurality of media assets being presented on a display. In some embodiments, the system identifies audio sounds the user prefers. In some embodiments, the system identifies unwanted audio sounds for muting. A display 101 illustrates a presentation of the multiple media assets and audio sounds associated with each media asset, in accordance with some embodiments of the disclosure. In scenario 100, a user device 102 receives multiple media assets for presentation. The multiple media assets may be a movie, a news report, a weather report, a sports report, or a sports event. The user device 102 may be a phone, a smartphone, a tablet, a laptop computer, a desktop computer, or any other device capable of presenting multiple media assets for consumption, whether live, recorded or streamed over the Internet. In one example, the user device 102 receives two football games for presentation where a first media asset 101 (e.g., Jets football game) is a presentation on the left side of the display on user device 102 and a second media asset 110 (e.g., Green Bay football game) is a presentation on the right on the user device 102. During the presentation of the multiple media assets on the user device 102, the system parses the respective audio streams for each of the multiple media assets to identify one or more preferred audio segments based on the user preferences. For example, the system may parse the audio stream 105 identified by the time bar of the first media asset 101 into respective audio segments 1MA1, 2MA1, 3MA1, 4MA1 and 5MA1. Although five audio segments are illustrated, such an example is non-limiting and may be any number of segments that are parsed by the system. The audio stream 105 may correspond to the audio of the first media asset 101. The system may generate different voice profiles for sounds within the audio stream 105. The audio stream 106 corresponds to the audio for the second media asset 110. For example, the system may parse the audio stream 106 identified by the time bar of the first media asset 110 into respective audio segments 1MA2, 2MA2, 3MA2, 4MA2 and 5MA2.

The system performs an analysis on the audio segments in the processing circuitry 906, which includes an audio module 110 configured to monitor audio of the first media asset and the second media asset and a user interface 112 for inputting user preferences. The processing circuitry may be communicatively connected to server database 114 to identify different segments and a user preference database 108 configured to store preferences indicated by the user. Upon processing the audio streams for both the first and second media assets, the processing circuitry generates a combined audio segment 116. The combined audio segment 116 includes audio segments (1MA1 and 1MA3) from the first media asset and the audio segments (2MA2, 4MA2, 5MA2) from the second media asset. Once the combined audio segment 116 is generated, it is transmitted to the user device 102 for presentation along with the video of the first media asset 101 and second media asset 110. The combined audio segment 116 is organized in sequential order and generated for presentation on the user device.

The system based on the aforementioned configurations improves the efficiency and enjoyment of the user experience because the system only transmits one audio file to the user device. In some embodiments, the user preference can be configured or based on learned preferences for the user. That is, based on previous user interactions with multiple media assets, the system may learn preferences for the user. In an event that includes multi topics, the system may seek user feedback to configure the user preferences. In some embodiments, the user preferences may be fed back to the broadcaster. Based on a user's choices of the channels, the system may generate automated audio mixing using existing NLP algorithms. In some embodiments, an audio segment of a plurality of media assets may be identified and time synced to both the events. In some embodiments, the audio segments include timestamps of start time and end time. During the transition between the different audio segments, the system may provide additional media assets, transition sounds or a presented original media asset. The identified key audio elements are mixed by retaining the consistent audio parameters and generating combined multi-event audio. In some embodiments, the system performs signaling to transmit two videos manifest and one audio manifest. At the end-user, both the manifest files preferred by the user will be loaded, the video segments will be fetched from the individual playlist and the audio will be discarded, but the combined audio will be used instead. A notice of which channels are combined is present in the combined audio signal in the playlist. Combined audio can be selected for the most popular channels or can be driven by user preferences. The system may also reduce bitrate transmitted between the server and the user device because only one audio stream is transmitted.

In some embodiments, the system transmits from a server to a user device the audio and mixed audio-video stream based on user preference for multi-event viewing. The system may continue to transmit as an audio-only mixed media asset. Based on the transmitted audio and video mixed content, the system identifies a time frame-based/critical event-based timeline for presentation on the user device.

The media asset segments for the first media asset and the second media asset may be identified based on user preferences for a particular event or commentator and stored on the server or a database 114. For example, a one- or two-second sample of the voice of a commentator in the first media asset may have been used to identify and generate a voice profile for the sound of the first media asset. In some cases, several such samples may be identified, and an average of each voice characteristic identified therein is used to parse the audio segments of the first media asset. Alternatively or additionally, the user device 102 or a cloud-based server may be prompted to learn the variations in voice characteristics of an audio stream for a first media asset and to recognize voices and recommend audio segments for presentation based on user preferences. In some embodiments, the audio between the two media assets may switch based on commercials. In some embodiments, the system, including the user device 102, may identify audible sounds on the display of a media asset based on the movement of a commentator's mouth to pinpoint which commentator is speaking. In some embodiments, a manifest file containing the information related to the speakers in the media asset may be transmitted to the consumption device. In some embodiments, the manifest file may include a closed caption received with the media asset that may identify the speaker before each line of text. For example, the name "Jim" may appear in the caption to indicate that Jim is speaking. In some embodiments, at the client-server level, the system may build a voice profile or sound profile of the audio stream corresponding to first media asset 101 based on the audio stream accompanying the media asset. In some embodiments, the user device 102 may receive from the server a voice profile or sound profile of the first media asset 101 based on the audio stream accompanying the media asset presentation while the first media asset 101 is presented for display. In one example, a user may be consuming a number of horror movies or shows and may prefer to hear (and watch) a media asset when it contains jolting and dramatic sounds. In such a case, the system increases the volume of that media asset and mutes the volume of the background sounds or audio of the second media asset.

In some embodiments, media asset data (via a manifest file) from server database 114 (e.g., content item source) may be provided to user device 102 using a client/server approach. For example, user device 102 may pull media asset data from a server (e.g., server database 114), or a server may push content item data to user device 102. In some embodiments, a client application residing on user device 102 may initiate sessions with a user preference database 108 to obtain manifest files including audio segments when needed, e.g., when the manifest file is out of date or when user device 102 receives a request from the user to receive data.

Media asset and/or manifest files delivered to user device 102 may be over-the-top (OTT) media assets. OTT media asset delivery allows Internet-enabled user devices, such as user device 102, to receive any media asset that is transferred over the Internet, including any media asset described above, in addition to media assets received over cable or satellite connections. An OTT media asset is delivered via an Internet connection provided by an Internet service provider (ISP), but a third party distributes the media asset. The ISP may not be responsible for the viewing abilities, copyrights, or redistribution of the media asset and may only transfer IP packets provided by the OTT media asset provider. Examples of OTT media asset providers include YouTube™, Netflix™, and Hulu™, which provide audio and video via manifest file. YouTube™ is a trademark owned by Google Inc., Netflix™ is a trademark owned by Netflix Inc., and Hulu™ is a trademark owned by Hulu. OTT media asset providers may additionally or alternatively provide manifest files described above. In addition to media assets and/or manifest files, providers of OTT media assets can distribute applications (e.g., web-based applications or cloud-based applications), or the media asset can be displayed by applications stored on consumption device 102.

In some embodiments, the audio stream 106 is transmitted into the presentation of the media asset while the output characteristics are adjusted. For example, the volume for the audio segment where the voice profile 106 is identified is modified. In another example, the volume for the audio segment where the voice profile 106 is identified is muted. In another example, second audio segment 106 is identified concurrently with first audio segment 104. Consumption device 102 may determine or instruct the server to transmit one of the audio segments from the second audio segment 106 and first audio segment 104. In some embodiments, the server transmits instructions to the user device 102 to prevent transmission by, for example, muting a speaker of user device 102 for a predetermined period of time, such as five seconds. After the predetermined period of time, the system via server 114 may return to transmitting the audio segment.

In some embodiments, the excitement scores are generated based on machine learning algorithms that rely on real-time video processing of live gameplay, as well as audio processing—such as converting the commentators' audio to text and performing natural language processing to assist a predictive engine in determining an excitement score for any given play. Additionally, sentiment analysis can be performed on the audio portion (e.g., audio associated with sports commentators) to assist in determining the excitement score. For example, the commentator's tone and pitch are normal during normal plays as opposed to other plays that might yield a touchdown, field goal, etc. In one embodiment, different predictive models are utilized based on the sport (e.g., soccer, hockey, football, etc.). Similarly, data can be used to model performance of players. Player stats are officially available for various leagues and sports and can be relied upon to create such models. The multi-view service supports the management of a plurality of sport types. The predictive engine relies on historical data and is initially powered by human-labeled scores (training dataset) on a variety of plays and variety of games. The scores are associated with video segments as well as audio of sports commentators. Predicting the outcome of a play is a classification model and depends on past and current data, including players involved in the play, previous performances, completion percentages, number of yards gained on a play, rushing yards, possession, etc. The training data set is updated after the results of the plays are known to keep improving the accuracy of the model. It is important to note that different models can be used for different play types.

Another method of filtering audio segments may be accomplished by transcribing a voice signal into corresponding text at the server or accessing a closed caption data to identify the subject matter. The server 114 may transcribe audio segment 104 into corresponding text or closed captions when not already available for the media asset. Using natural language processing, server 114 may determine a language usage level. The server may compare the language usage level with preferences for user 107 from user preference database 108. User device 102 may determine which audio segments of the transcribed text should be transmitted into the media asset and which should be muted based on the context of the media asset. For example, if the first media asset includes a news report, audio spoken by the first media asset may be transmitted, while if the second media asset is a weather report, audio spoken by the second media asset may be not transmitted. Alternatively or additionally, user device 102 may determine the subject matter of each audio segment of the text. Based on preferences to avoid scary stories, crime stories, or traffic stories, as received in a selection from the user at the consumption device 102, user preference database 108 may also include subject-matter data as well as actions to perform when the particular voice profile is identified. For example, the user may have saved a control action for audio segments that contain some subject matter or certain people to decrease the volume a specific amount, present closed captions or mute the media asset altogether.

In some embodiments, the "multi-view" service dynamically adapts to bandwidth fluctuation as well. For example, if two games are playing side by side and there's a sudden drop in bandwidth at the client side, then the multi-view service stops streaming one of the games so that the available bandwidth is allocated to just one game. The decision on which live stream to keep playing depends on the actions in the game at that time, as well as user preferences. For example, a red-zone play in Game A takes priority over a mid-field play in Game B if the bandwidth available to be reallocated to the client (as a result of ceasing the streaming of Game B) results in a better picture quality for Game A. For example, the red-zone play can then be streamed in UHD if Game B isn't being viewed.

In one embodiment, the multi-view service manages the requests (e.g., requests for media segments) on behalf of the various players, including instantiating additional players, assigning streams to players of different sizes and locations on the screen, determining which game(s) to keep live streaming, etc. This multi-view service makes such determinations based on information queried from the client as well as remote services, such as a service that provides excitement scores of games. The multi-view service can be considered as a proxy between the video player(s) and the various streaming sources.

The multi-view service can terminate/pause a stream from a first source (e.g., channel broadcasting Game B) and request media content from a second channel, e.g., initiate the request on behalf of a video player for a second stream (e.g., Game A). Similarly, the multi-view service is capable of intercepting manifests for various games, and manipulating them, e.g., by creating a different manifest that only includes references to the segments that should be played, including merging references to content from different manifests into one so that the same player instance can request the content associated with the various games intended for any particular user. For example, a first portion of the manifest contains references to segments associated with Game A while the second portion contains references associated with Game B.

In yet another embodiment, the multi-view service aggregates references to segments associated with various games that the user is watching, e.g., segments that depict interesting plays that were not sent to the video player due to false negatives of the predictive engine, and makes them available to the user in a highlight reel, game summary, etc. Additionally, this missed content can be sent to the client when other games are idle (e.g., no interesting plays are taking place in any of the games that the user subscribed to watch through the multi-view service).

In one embodiment, the media content associated with games that were not requested from the video player(s) is buffered and available for the user. For example, many live games on platforms such as MLB are available on demand after the game is over. Such platforms allow users to rewind through the content throughout the game. That same content can also be used to create the game summary, highlight reels, etc. A dedicated service provides the excitement scores associated with various games, or games of interest to the user, to the multi-view service. For example, the multi-view service can subscribe to receive specific updates for specific games, based on the games that the user selected for viewing, or based on user preferences learned over time. For example, the multi-view service can subscribe to notifications concerning red zone plays, potential score changes, injuries, etc., for specific teams/games. The term "subscribing" in this context is in addition to picture quality for Game A. For example, the red-zone play can then be streamed in UHD if Game B isn't being viewed.

In some embodiments, the multi-view service manages the requests (e.g., requests for media segments) regarding various players, including instantiating additional players, assigning streams to players of different sizes and locations on the screen, determining which game(s) to keep live streaming, etc. This "multi-view" service makes such determinations based on information queried from the client as well as remote services, such as a service that provides excitement scores of games. The multi-view service can be considered as a proxy between the video player(s) (e.g., devices) and the various streaming sources. The multi-view service can terminate/pause a stream from a first source (e.g., channel broadcasting Game B) and request media content from a second channel, e.g., initiate the request on behalf of a video player for a second stream (e.g., Game A). Similarly, the multi-view service is capable of intercepting manifests for various games and manipulating them, e.g., by creating a different manifest that only includes references to the segments that should be played, including merging references to content from different manifests into one so that the same player instance can request the content associated with the various games intended for any particular user. For example, a first portion of the manifest contains references to segments associated with Game A while the second portion contains references associated with Game B.

In yet another embodiment, the multi-view service aggregates references to segments associated with various games that the user is watching, e.g., segments that depict interesting plays that were not sent to the video player due to false negatives of the predictive engine and makes them available to the user in a highlight reel, game summary, etc. Additionally, this missed content can be sent to the client when other games are idle (e.g., no interesting plays are taking place in any of the games that the user subscribed to watch through the multi-view service). In one embodiment, the media content associated with games that were not requested from the video player(s) are buffered and available for the user. For example, many live games on platforms such as MLB are available on demand after the game is over. Such platforms allow users to rewind through the content throughout the game. That same content can also be used to create the game summary, highlight reels, etc.

Dedicated service provides the excitement scores associated with various games, or games of interest to the user, to the multi-view service. For example, the multi-view service can subscribe to receive specific updates for specific games, based on the games that the user selected for viewing, or based on user preferences learned over time. For example, the multi-view service can subscribe to notifications concerning red zone plays, potential score changes, injuries, etc., for specific teams/games. In this context, the term "subscribing" is in addition to notifications and is used by the multi-view service to determine which content to show to the user.

Figure 2A:
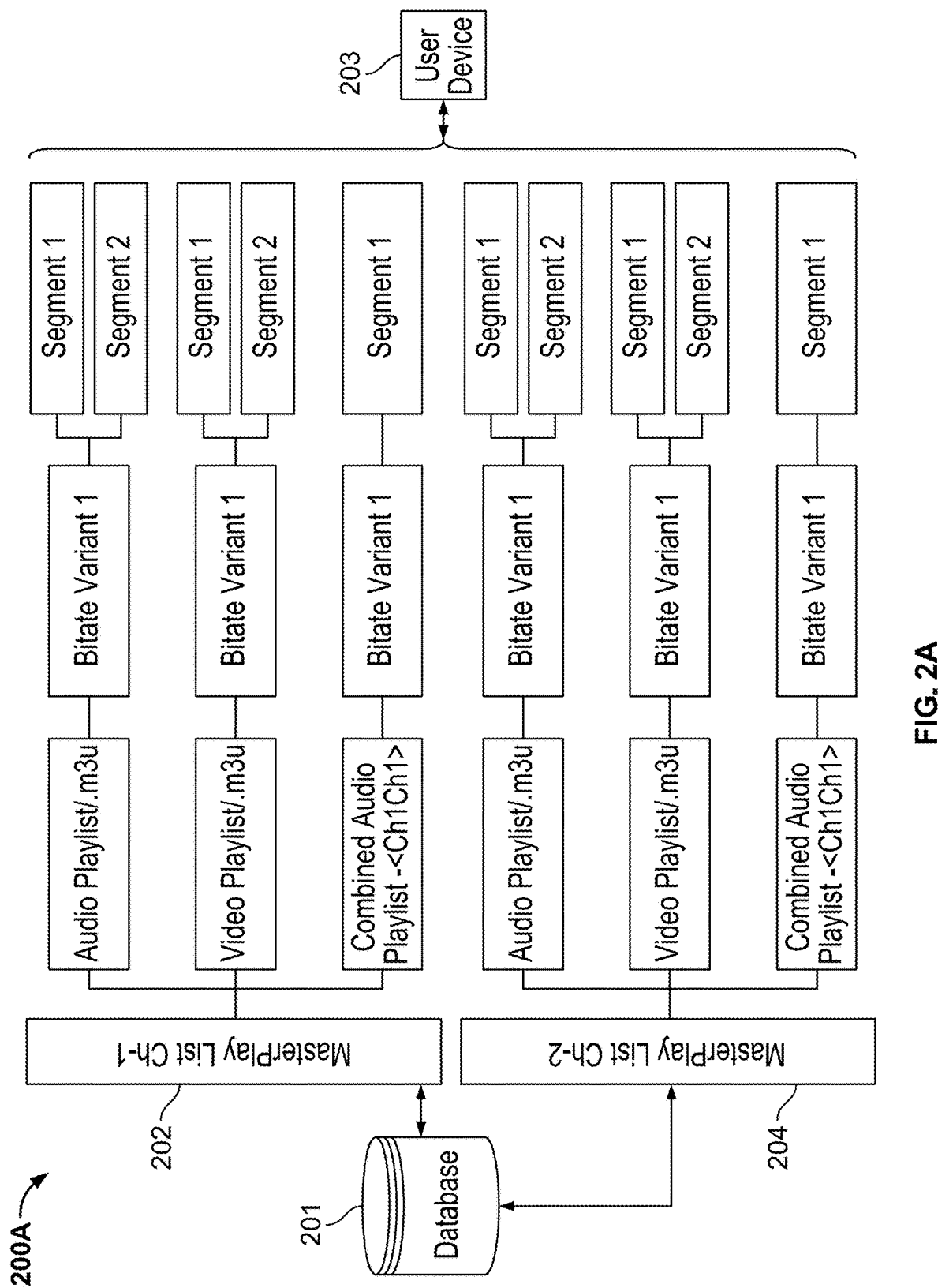
FIGS. 2A and 2B show an exemplary scenario 200 in which multiple audio segments are combined from a plurality of media assets, in accordance with some embodiments of the disclosure.
Figure 2B:
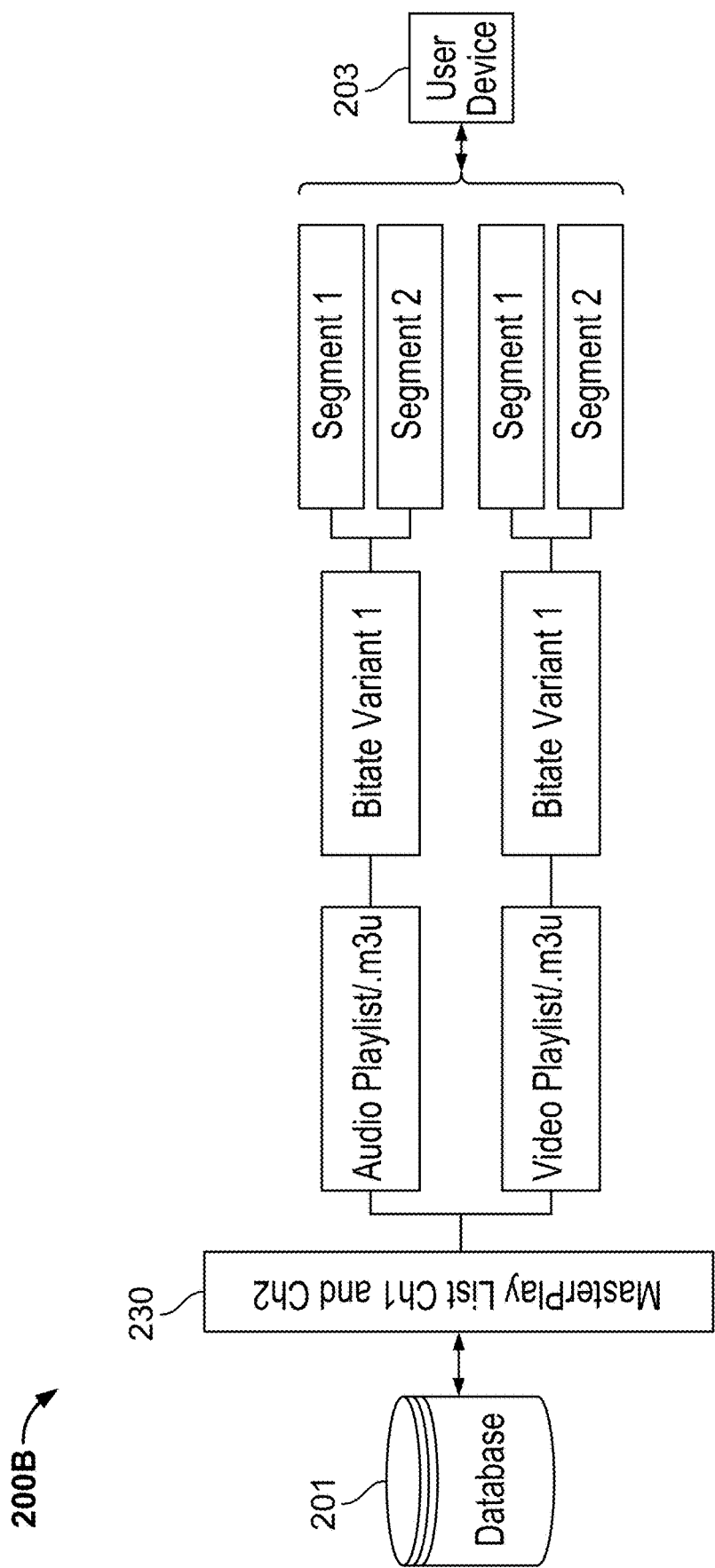

FIG. 2A shows a real-time adaptive bitrate transcoding of a media asset, and transmission of transcoded media to a client device over a network for playback, which accounts for latency in the network itself, as well as any additional latency introduced by the transcoder. FIG. 2A is a block diagram representing the transmission of data broken down to audio playlist and video playlist and a combined playlist for a first channel between a server device (e.g., database 201) and a client device (e.g., user device 203) in accordance with some embodiments of the disclosure. Database 201, which may be cloud-based server database, may receive a request for multiple media assets, and in response to the request transmit to a client device 203 the multiple media assets. Client device 203, which may be a user equipment device (e.g., a set-top box) or a mobile device of a user, may transmit a request for a first portion of the first media asset and for a first portion of the second media asset. In some embodiments, the database 201 may generate a combined audio playlist for the two requested media assets. The database 201 may then transmit the first media asset (e.g., Master Playlist Ch. 1) including the audio playlist, video playlist and a combined audio playlist. Similarly, the database 201 may then transmit for the second media asset (e.g., Master Playlist Ch. 2) including the audio playlist, video playlist and a combined audio playlist. As shown in FIG. 2B, the server device 201 may transmit a combined audio playlist and video playlist 230 (e.g., Master Playlist Ch. 1 and Ch. 2) for the first media asset and the second media asset in response to the request. In some embodiments, as part of the transmission of the first portion, database 201 may also transmit a manifest of audio playlists and a manifest of video playlists, each being associated with a bitrate variant, where each manifest varies the amount of output data per time segment. Control circuitry of the client device 201 may process the transcode latency values to determine a second bitrate at which to request a second portion and/or a time to transmit the second request or switch transmitting.

As used herein, a "portion" may be a "segment" or "chunk" of the media asset, or any other part of the media asset that represents, contains, or comprises less data than that of the media asset as a whole. A "segment" may comprise a number of seconds of media content for output on the client device, and may be the minimum unit of media that can be played back by the client device 102. For example, a segment may comprise five seconds of audio and video data representing a five-second portion of the media asset. A "chunk" may comprise a quantity of data less than that of a complete segment at a requested bitrate. A segment may be divided into a plurality of chunks for transmission using HTTP chunked transfer encoding or any other suitable streaming data transfer protocol.

The server device 201 and client device 203 may be connected via a communications network, as described below. Each of the server device 201 and client device 203 may comprise control circuitry for performing any of the steps, actions, and/or processes described herein. The server device 201 may further include transcoding circuitry, which may be part of the control circuitry, or may be a separate module. The transcoding circuitry may be implemented in hardware, firmware, or software. The client device 203 may further include a display and speaker modules for playback of transcoded media.

Systems and methods are described herein for a media guidance application that detects a user's engagement with a second media asset and alerts the user to an event in the second media asset being presented on another channel, thereby reminding the user to view the media asset presented on the user device. The media guidance application may determine when the next important event will occur in the second media asset and determine an estimated usage time of the user device based on the application with which the user is engaged on the user device. The media guidance application may, depending on the estimated usage time and the time of the next important event in the second media asset, pause the presentation of the first media asset and suggest viewing the second media asset on the display of the user device. In some embodiments, the media guidance application presents the second media asset in multi-view mode, or overlays the presentation of the second media asset over the presentation of the first media asset.

As an example, the user may be watching the movie "Star Wars" on the user device. During the movie, the system may monitor, based on user preference, a second media asset. The system may process the second media asset based on object analysis 314, frame analysis 316, subtitle analysis 318, speech analysis 320 and/or natural language processing 322. Based on each of the analyses, the system may recommend via an alert to switch to the second media asset for a scene or segment of the second media asset. The media guidance application may determine that a first media asset is being presented on the display and estimate an amount of time when the second media asset will come on. For example, the media guidance application may access a user preference and user history to determine what the user prefers to consume. The media guidance application may determine when the next important event in the second movie occurs. For example, the media guidance application may access metadata of the second "Star Wars" movie and determine that the next important event (e.g., the death of Obi-Wan Kenobi at the hands of Darth Vader) will occur in five minutes. The media guidance application may compare the important event and the time to consume the media asset against the current media asset presented on the media device. The system may recommend for the important event to be presented by way of an alert during the presentation of the first media asset. In some embodiments, the media guidance application may present an alert on the second device that the user may soon miss an important event.

Figure 3:
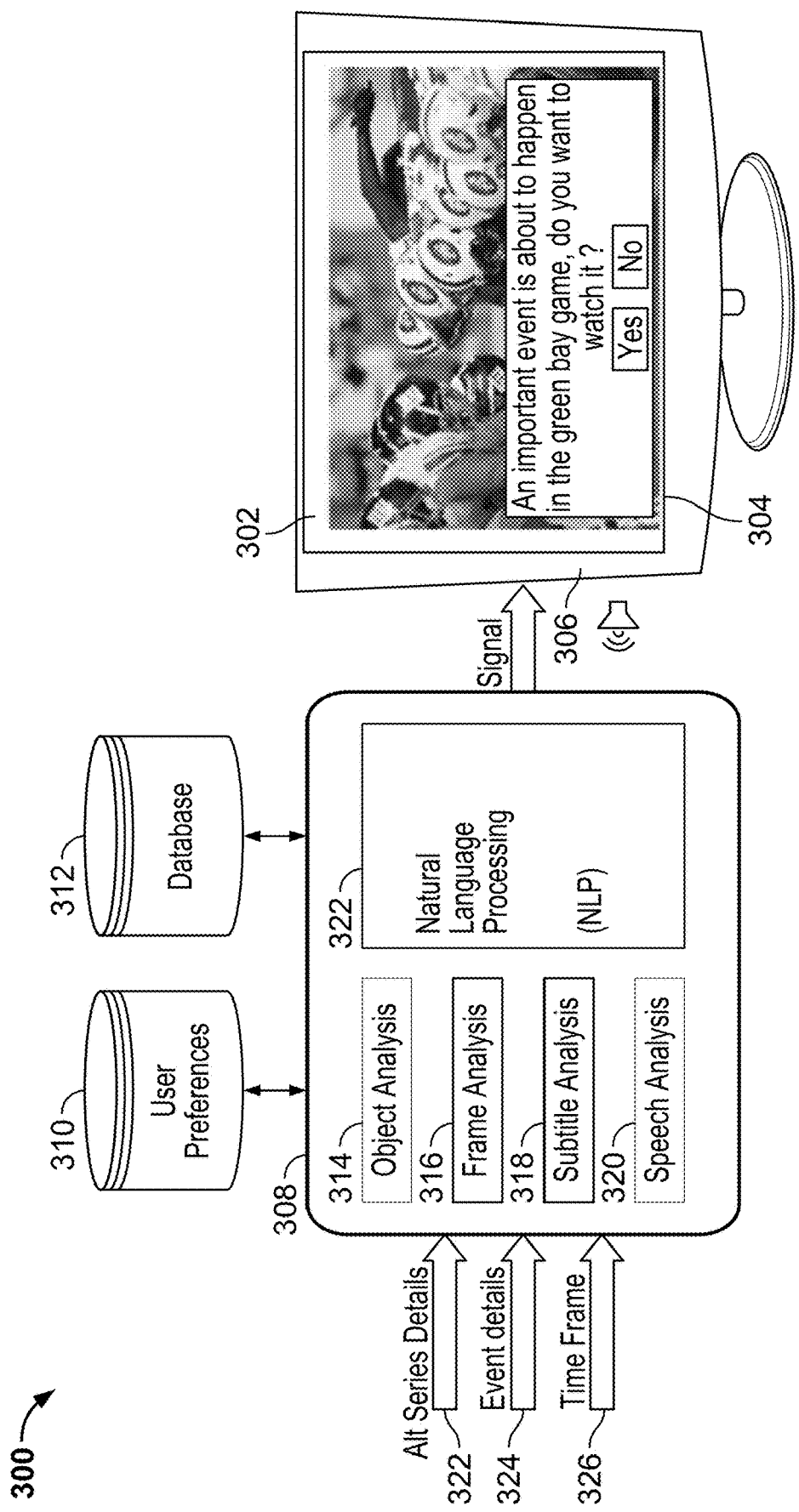
FIG. 3 shows an alternate exemplary scenario 300 in which multiple audio segments are identified from a plurality of media assets to be combined for presentation on a user device, in accordance with some embodiments of the disclosure.

FIG. 3 shows an exemplary user device and an exemplary alert generated by the media guidance application for display on the second device 304. In some embodiments, the media guidance application may generate for display, at a user device, a first media asset 302. For example, the media guidance application may generate for display a football game on the user device. The football game may be generated for display from a broadcast stream received at the first device, an over-the-top streaming application on the user device, or a recording stored in a memory of the first device. In some embodiments, the system retrieves details of users' viewing patterns, and preferred characters are learned or initially captured by user interference from other shows or movies the user is interested in. Based on a predicted time window of when the event is likely to occur in the second media asset (e.g., near the end of an Olympic race, halftime of a football match), the system identifies when to switch channels to consume the event. The system then configures the consumption on a user device of "N" event, where the maximum threshold of N can be derived based on the end-user device's hardware capabilities.

FIG. 3 further shows a system that performs processing of the media assets upstream of the user device. The system includes an analyzer 308 that analyzed the varying media assets to identify events that the user may be interested in. In particular, the analyzer 308 receives the media asset details 322, metadata pertaining to the media asset 324 and time frame 326 and performs object analysis 314, frame analysis 316, subtitle analysis 318, speech analysis 320 and/or natural language processing 322. As part of an object analysis 314, the processing circuitry monitors for objects within a media asset. In some embodiments, object analysis 314 performs an analysis of actors in the media asset. As part of a frame analysis 316, the processing circuitry monitors frames within a media asset for brightness, speed and general layout. In some embodiments, frame analysis 316 performs an analysis of locations within the media asset. As part of a subtitle analysis 318, the processing circuitry monitors the closed captions of the media asset for keywords that may interest the user. As part of the speech analysis, 320 control circuitry analyzes a base frequency of voice signal and determines a plurality of voice characteristics, such as pitch, intonation, accent, loudness, and speech rate. This data may be stored in association with a character or a media asset. As part of natural language processing, 322 control circuitry performs an analysis of language and tries to determine the subject matter discussed. In some embodiments, the processing circuitry compares, based on the analysis, each segment of the second media asset with user preferences. In some embodiments, the processing circuitry determines that a segment of the second media asset matches the user preferences. When the second media asset segment matches the user preferences, the system may prompt an alert for the user. In some embodiments, the alert is displayed on the user's device. In some embodiments, the alert is presented on a secondary user device or a mobile device. In some embodiments, in response to the alert, the user device may receive a selection of the event. In some embodiments, in response to selecting to view the event, the media guidance application may generate for display on the user device, in a picture-and-picture mode, the segment of the second media asset.

In some embodiments, the media guidance application may, when performing the analysis, based on metadata, of a playback time of an important event in the media asset, access a database 312 of playback times corresponding to important events in the media asset. The database may be stored locally or may be stored on a remote server. The playback times may be relative to the start of the media asset or may be actual times based on the time at which the playback of the media asset began. For example, a database 312 for "football games" may indicate important events at ten minutes, twenty-five minutes, fifty-three minutes, and eighty-four minutes from the start of the game. The important events are determined based on the analysis of the media asset and the user preferences. For example, the user enjoys watching a certain football team in a scoring position. The media guidance application may determine, based on the current playback time, the next important event in the media asset in the database. For example, suppose the current playback time for a "football game" is seven minutes. In that case, the media guidance application may determine that the next important event occurs is at three minutes and retrieve three minutes as the playback time of the next important event. In some embodiments, the determination is performed on live programming based on the above-discussed analysis. In such cases, the lead time to identify and mark an event as important may be a couple of seconds. As another example, the database for a broadcast of the "Jets game," which began at 7:00 PM, may indicate important events at 7:10 PM (e.g., kickoff) as well as determine an important event in response to the analysis that is performed on the programming. If the current time is 7:47 PM, the media guidance application may determine that the next important event occurs at 7:48 PM based on the lag in transmitting the live programming. The media guidance application may compare the current time with the times indicated in the database by first converting both times to a UTC integer value, or compare the current time's hour and minute values with those of the event times indicated in the database.

In some embodiments, the system may present an alert on the display of the device for the user to view the important event. In some embodiments, in response to presenting the second media asset to the user device, the system determines that a playback time ended of the segment of the second media asset (e.g., the important event ended). In some embodiments, the system may present textual updates of the second media asset during the presentation of the segment. In some embodiments, the segment is auto-triggered into the display of the user device via PIP or a dual-view display. Based on the playback of the segment of the second media asset ending, the system generates for display on the user device the first media asset of the plurality of media assets. For example, as the scoring drive in the Jets game ends, the system returns to the first media asset. In some embodiments, the media guidance application, upon determining that the segment of the second media asset has concluded, automatically switches back to generating for display the first media asset.

Figure 4:
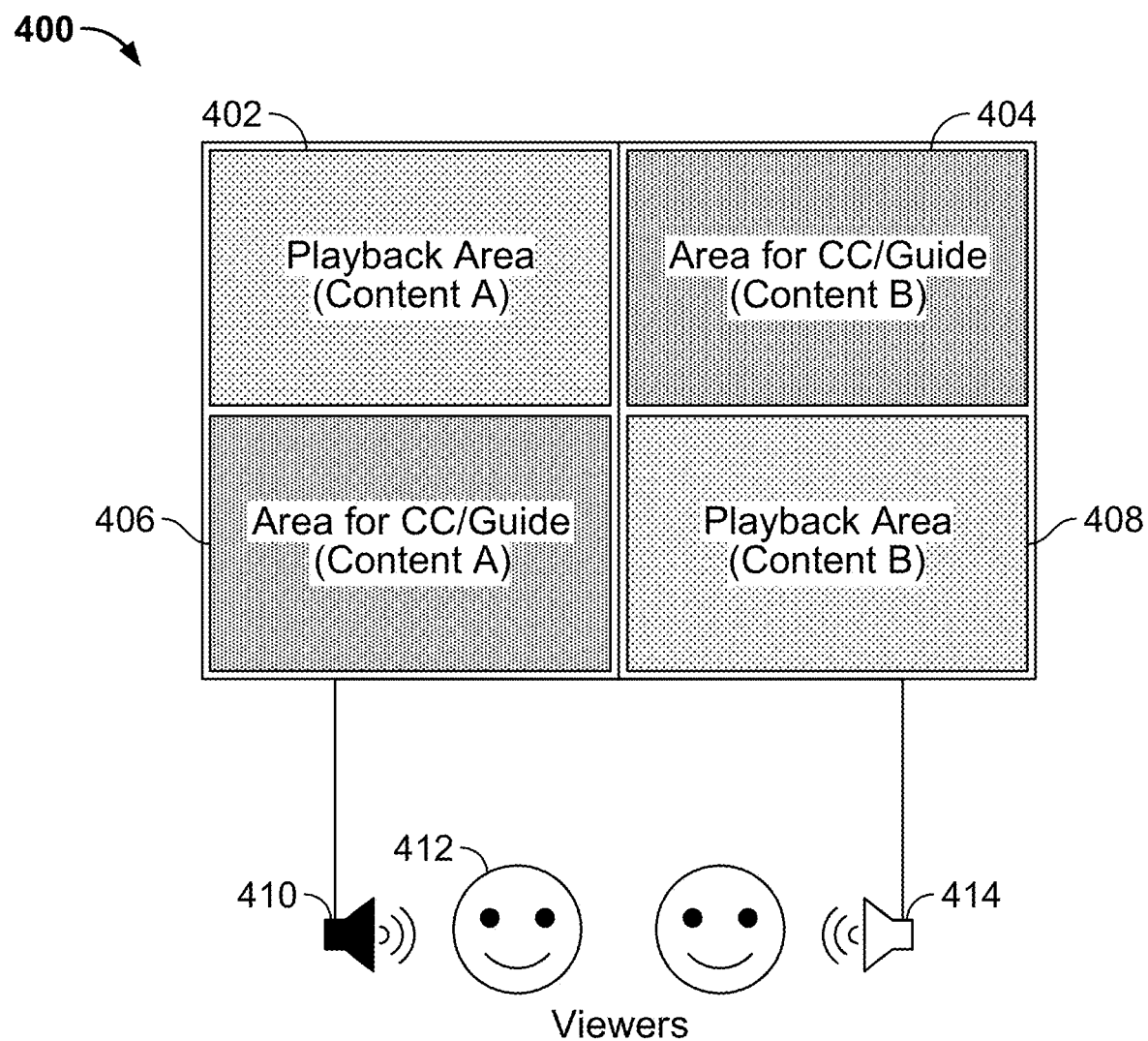
FIG. 4 shows an alternate exemplary scenario 400 in which multiple audio manifests are combined into a single combined audio manifest from a plurality of media assets, in accordance with some embodiments of the disclosure.

FIG. 4 shows an exemplary user device 400 and several exemplary displays with the user device. In some embodiments, the media guidance application may generate a multi-view or quad view display with multiple media assets as previously discussed above in relation to multi-view and quad view. The user device 400 includes a first screen 402 presenting a first media asset, a second screen 408 presenting a second media asset, a third screen 406 presenting closed captions corresponding to the first media asset and a fourth screen 404 presenting closed captions corresponding to the second media asset.

The methods and systems include receiving a request for a first media asset and a second media asset for presentation on a user device. For example, a user wants to watch the Jets football game and a Patriots football game on the same television. With the use of a media guidance application, the system generates a user interface including a first screen configured for the presentation of the first media asset and a second screen configured for the presentation of the second media asset. For example, a grid mode is presented with each football game reserved for one of the boxes in the grid. The system processes an audio manifest for the first media asset and the second media asset. Each audio manifest includes a plurality of audio segments, each audio segment being associated with a priority rating. For example, the user parses the audio segments into smaller, more consumable audio versions based on priority bits assigned by a service provider. For example, each segment receives a priority rating. The system then compares the priority rating for each audio segment from the first media asset with the priority rating for each audio segment from the second media asset. Based on the comparing, the system generates a combined audio manifest with audio segments from the first media asset and the second media asset based on the audio segment having a higher priority rating. Finally, the system transmits for presentation on the user device a video stream of the first media asset on the first screen, a video of the second media asset on the second screen and the combined audio manifest.

In some embodiments, the processing circuitry identifies closed captioning for each audio segment and inserts the closed caption of the media asset that is being muted or for which volume is reduced. For example, as the user consumes two football games, the first media asset is muted and the audio for the second media asset is presented. At the same time as the first media asset is muted, the closed captions are presented to permit the user to read about the video on the first media asset. In some embodiments, the presentation on the user device of the closed caption for each audio segment was determined to have a lower priority rating. For example, as the priority of the different segments changes, the closed captions are turned on and off for the media assets. In some embodiments, the processing circuitry generates the combined audio manifest by identifying a priority rating of a first segment of the first media asset and identifying a priority rating of a second segment of the second media asset. The first segment of the first media asset overlaps in presentation with the second segment of the second media asset. The processing circuitry determines between the first segment of the first media asset and the second segment of the second media asset a preferred segment based on a higher priority rating. The processing circuitry interleaves the preferred segment with subsequent audio segments with a higher priority rating to create a combined audio manifest. In some embodiments, the processing circuitry arranges each audio segment of the first media asset and the second media asset to interleave the media assets in a sequence.

In some embodiments, generating the combined audio manifest is a user enable mode. In some embodiments, the processing circuitry generates the combined audio manifest by generating the combined audio segment via an audio priority analyzer, configured to compare each concurrent audio segment and switch to a higher priority audio segment. In some embodiments, the priority rating for each segment is biased based on a user preference of the user device.

In some embodiments, the processing circuitry in response to transmitting for presentation on the user device, the video stream of the first media asset on the first screen, the video of the second media asset on the second screen and the combined audio manifest, receiving a selection for an audio segment from the first media asset. The processing circuitry transmits for presentation on the user device, the video stream of the first media asset on the first screen, the video of the second media asset on the second screen and the audio segment from the first media asset. For example, during the presentation of the important event, the user chooses to listen to the audio segment of the other media asset on the display screen.

Figure 5:
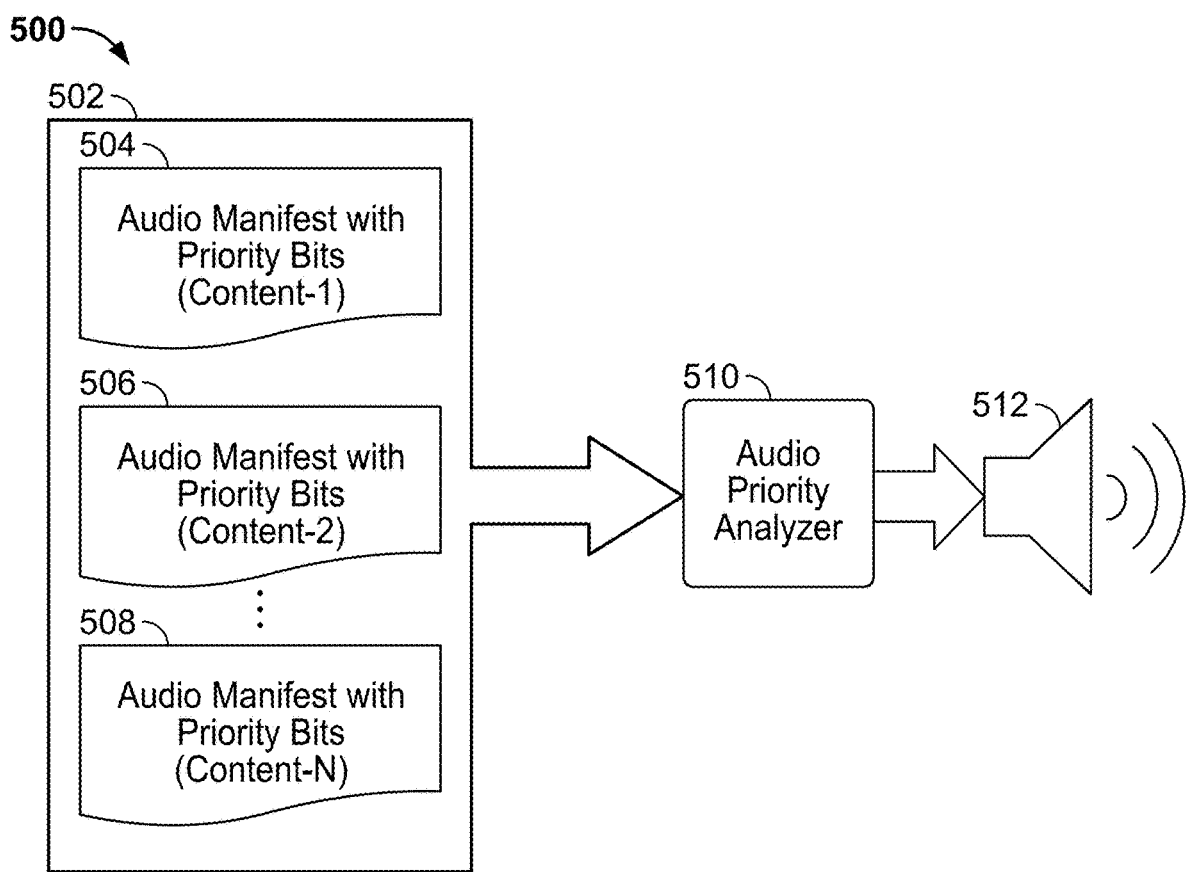
FIG. 5 is a block diagram of an illustrative device for combining multiple audio manifests from a plurality of media assets to a single combined audio manifest, in accordance with some embodiments of the disclosure.

FIG. 5 shows a real-time audio priority analyzer 510 of a collection 502 of audio manifests 504, 506, 508 of a plurality of media assets. FIG. 5 is a block diagram representing the compiling of the audio manifest for a plurality of media assets through an audio priority analyzer 510 to generate a single audio manifest to be presented through speakers 512 of a user device. The priority ratings may be user-entered, system-generated, system-captured, a third party-captured and/or assigned to each media asset or a combination thereof. For example, an online blog of sections of a show or a movie may provide a high rating for action segments or love segments. The priority rating of each media segment may vary based on the totality of the circumstances surrounding the audio segment. The user may prefer violent and vulgar content. As a result, the priority rating may be biased/adjusted based on the respective user when such a scene or segment comes on. Based on the priority rating, the system transmits a video playlist and a combined audio playlist for the first channel between a server device (e.g., database 201) and a client device (e.g., user device 203) in accordance with some embodiments of the disclosure.

Figure 6:
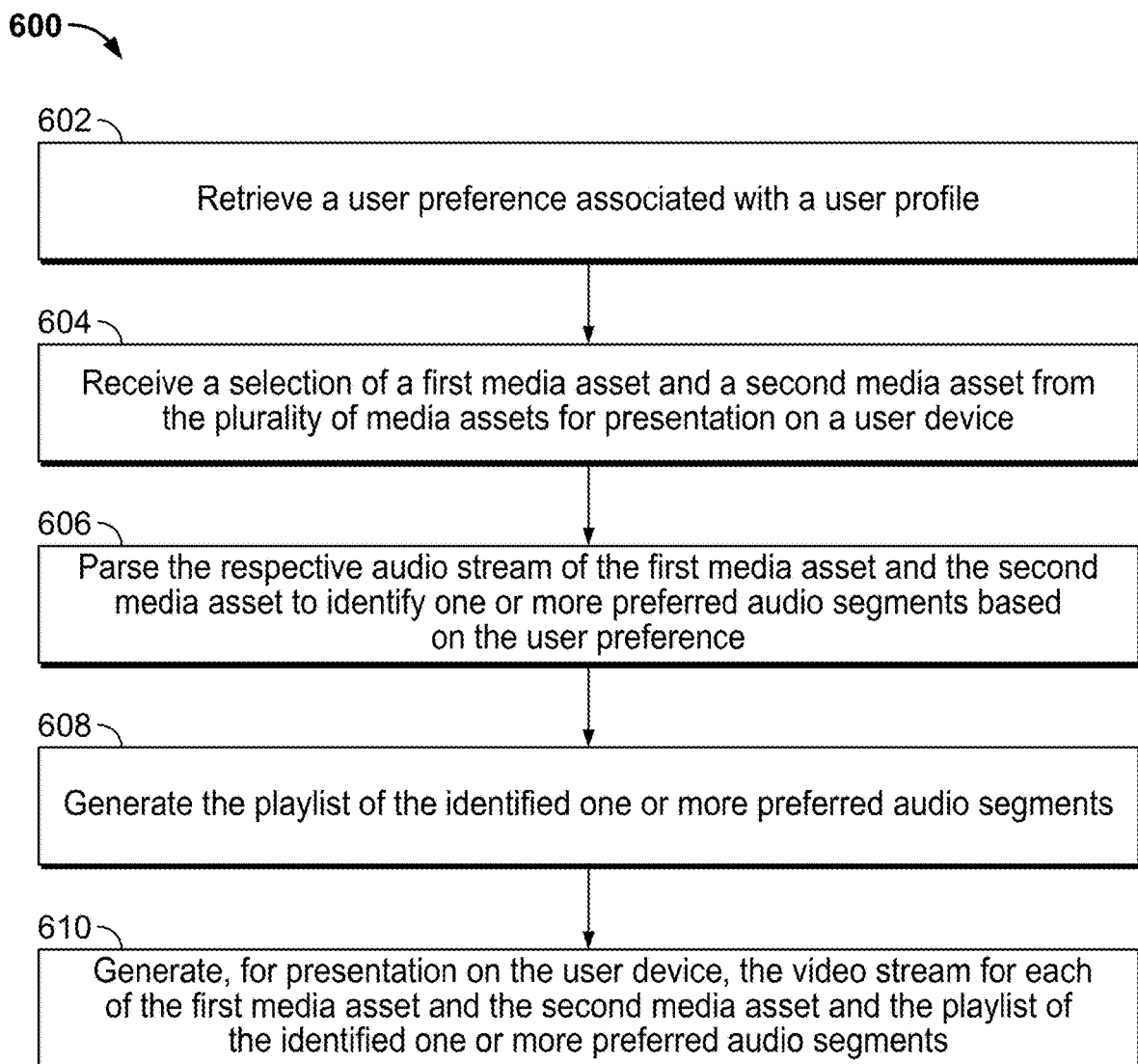
FIG. 6 depicts a flowchart of an illustrative process in which multiple audio segments are combined from a plurality of media assets, in accordance with some embodiments of the disclosure.

FIG. 6 is a flowchart representing an illustrative process generating an audio playlist from a simultaneous presentation of a plurality of media assets. The flowchart in FIG. 6 represents a process 600 implemented on control circuitry 904 to generate a playlist from a simultaneous presentation of a plurality of media assets. It should be noted that process 600 or any action thereof could be performed on, or provided by, any of the devices shown in FIGS. 9-10. For example, process 600 may be executed by control circuitry 904 (FIG. 9) as instructed by a media guidance application implemented on a user device (e.g., user equipment devices 1002, 1004, and/or 1006 (FIG. 10) discussed in more detail below) in order to generate a playlist from a simultaneous presentation of a plurality of media assets.

At 602, control circuitry 904 may be configured to retrieve, by control circuitry, a user preference associated with a user profile. For example, database 108 may store user preferences that the user has input into the user device 102. In some embodiments, the user preferences are identified based on viewing history. The user preference may include a list of favorite teams, favorite sports, favorite players, favorite shows, actors, viewing conditions (e.g., very loud, very quiet), array, or other data structure listing.

At 604, control circuitry 904 may be configured to receive a selection of a first media asset and a second media asset from the plurality of media assets for presentation on a user device. For example, control circuitry 904 may receive a selection to view two different media assets (e.g., football games, Olympic events).

At 606, control circuitry 904 may be configured to parse the respective audio streams of the first media asset and the second media asset to identify one or more preferred audio segments based on the user preference. For example, the control circuitry may evaluate the media assets to identify segments that may be broken up (e.g., by a commercial, or change in subject matter, change in tone). Control circuitry 904 may use the data relating to past media assets to parse the audio stream of the first media asset into the segments. Similarly, control circuitry 904 may use the data relating to past media assets to parse the audio stream of the second media asset into the segments. Based on the parsed segments of the multiple media assets, the control circuitry may identify preferred segments based on comparison to the user's preferences.

At 608, control circuitry 904 may be configured to generate the playlist of the identified one or more preferred audio segments. For example, control circuitry 904 may combine the identified audio segments from the first and second media assets into a single combined audio stream.

At 610, control circuitry 904 may be configured to generate, for presentation on the user device, the video stream for each of the first media asset and the second media asset and the playlist of the identified one or more preferred audio segments. For example, control circuitry 904 may generate for television the first media asset (Jets football game) and the second media asset (Patriots football game) along with the generated combined audio of both games. That is, as the user is watching both games on the display, in a dual-view mode, the audio bounces back and more forth from the Jets game and the Patriots game autonomously with no input from the user. This way, the user may switch her/his attention to the football game where audio is coming from and is freed from manually switching the channels.

The actions and descriptions of FIG. 6 may be used with any other embodiment of this disclosure. In addition, the actions and descriptions described in relation to FIG. 6 may be done in suitable alternative orders or in parallel to further the purposes of this disclosure. Any of these actions may also be skipped or omitted from the process. Furthermore, it should be noted that any of the devices or equipment discussed in relation to FIGS. 9-10 could be used to perform one or more of the actions in FIGS. 6 and 8.

Figure 7:
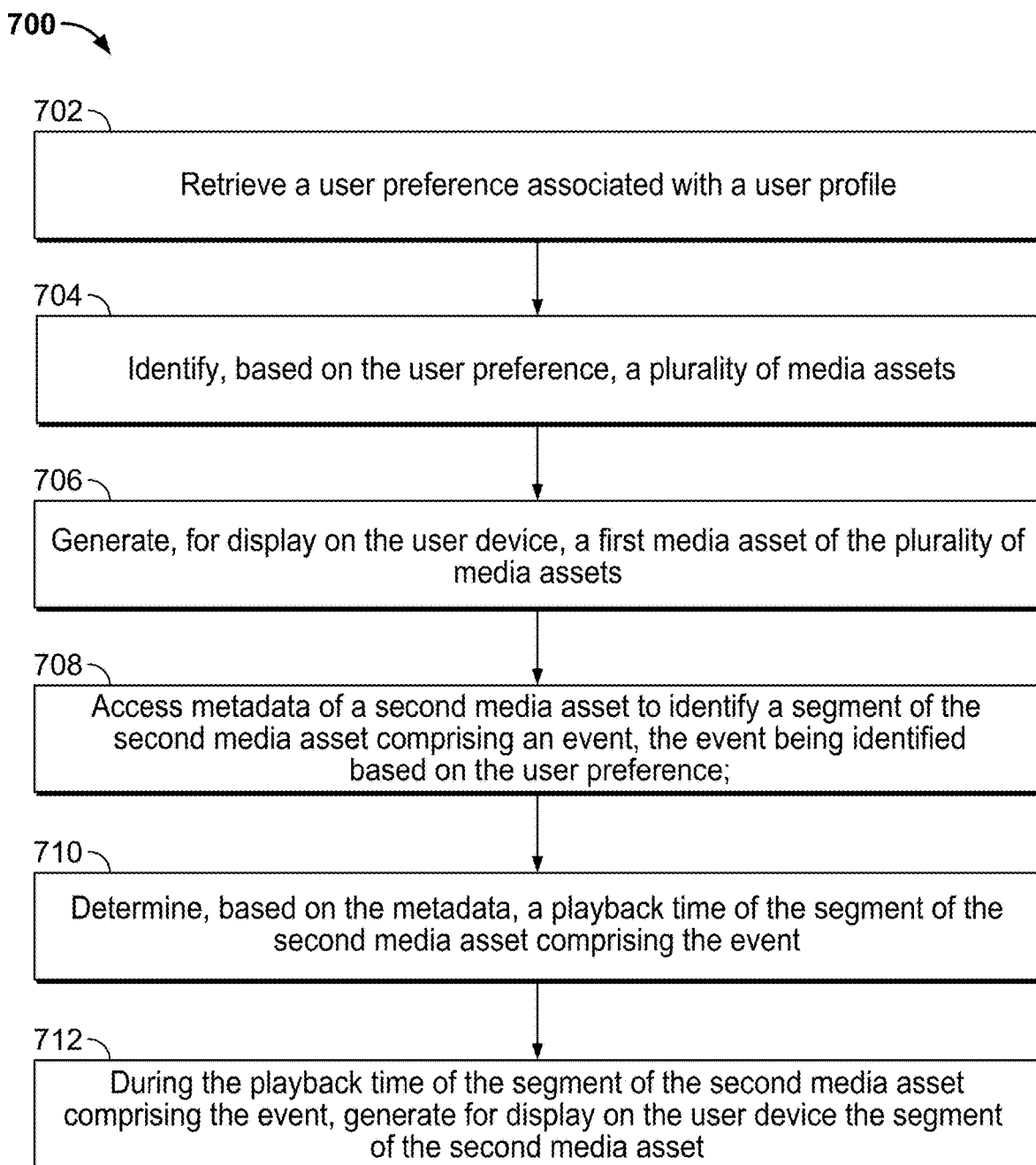
FIG. 7 depicts a flowchart of an illustrative process in which multiple audio segments are combined from a plurality of media assets, in accordance with some embodiments of the disclosure.

FIG. 7 is a flowchart representing an illustrative process for identifying events in a second media asset and generating the second media asset for the presentation of an event in the second media asset. The flowchart in FIG. 7 represents a process 700 implemented on control circuitry 904 to identify events in a second media asset and generate the second media asset to present an event in the second media asset. It should be noted that process 700 or any action thereof could be performed on, or provided by, any of the devices shown in FIGS. 9-10. For example, process 700 may be executed by control circuitry 904 (FIG. 9) as instructed by a media guidance application implemented on a user device (e.g., user equipment devices 1002, 1004, and/or 1006 (FIG. 10) discussed in more detail below) in order to identify events in a second media asset and generate the second media asset for the presentation of an event in the second media asset.

At 702, control circuitry 904 may be configured to retrieve a user preference associated with a user profile. For example, database 108 may store user preferences that the user has input into the user device 102. In some embodiments, the user preferences are identified based on viewing history. The user preference may include a list of favorite teams, favorite sports, favorite players, favorite shows, actors, viewing conditions (e.g., very loud, very quiet), array, or other data structure listing.

At 704, control circuitry 904 may be configured to identify, based on the user preference, a plurality of media assets. For example, control circuitry 904 may receive a selection to view a first media asset and identify a second media asset that the user profile has been consuming.

At 706, control circuitry 904 may be configured to generate a first media asset of the plurality of media assets for display on the user device. For example, the media guidance application may process the media asset and generate video and audio signals for output via display 412 and speakers 414, respectively, on the user device.

At 708, control circuitry 904 may be configured to access metadata of a second media asset, to identify a segment of the second media asset comprising an event, the event being identified based on the user preference. For example, control circuitry 904 may access metadata stored in a database pertaining to the media asset. In some examples, the media asset may be a series and may be transmitted over the Internet including metadata about certain events within the media asset. The metadata related to the second media asset may be retrieved from a memory of the second device or cloud-based storage from the content source. For example, the metadata may include data fields comprising an index of events and corresponding playback times. As another example, the metadata may include data fields indicating the importance of the event represented in the current scene or in the next scene. Control circuitry 904 may search the metadata, based on the current playback time, for the next scene with an indicated importance level above a threshold importance level.

At 710, control circuitry 904 may be configured to determine, based on the metadata, a playback time of the segment of the second media asset comprising the event. For example, control circuitry 904 may add the estimated additional amount of time to the length of the second media asset. For example, the metadata may include a timestamp of the event or may include a relative amount of time from the current playback time to the important event. Control circuitry 904 may calculate the amount of time between the current playback time and the playback time of the important event. Alternatively, control circuitry 904 may convert the current system time to an integer representing the current system time in Universal Time Code ("UTC") format. Control circuitry 904 may also convert a broadcast time of the next important event to a UTC integer value. Control circuitry 904 may then subtract the integer representing the current time from the integer representing the broadcast time of the next important event to determine the threshold amount of time. Control circuitry 904 may store the threshold amount of time in a variable or other data structure in, for example, storage 908.

At 712, control circuitry 904 may be configured to, during the playback time of the segment of the second media asset comprising the event, generate for display on the user device the segment of the second media asset. For example, control circuitry 904 may instruct the user device 302 to display a pop-up message reminding the user to watch "Football game" on the user device because an important play/scene is coming soon. For example, control circuitry 904 may transmit a command to the user device 302 such as "ALERT [media_name]" where [media_name] is the title of the media asset being viewed on the user device, such as "Jets football game." Depending on the configuration of control circuitry 904, the alert displayed on the second device 302 may include an option to record the media asset. Control circuitry 904 may, alternatively or additionally, include an option to pause the media asset in the alert. The alert may also include an option to dismiss the alert without taking any action.

The actions and descriptions of FIG. 7 may be used with any other embodiment of this disclosure. In addition, the actions and descriptions described in relation to FIG. 7 may be done in suitable alternative orders or in parallel to further the purposes of this disclosure. Any of these actions may also be skipped or omitted from the process. Furthermore, it should be noted that any of the devices or equipment discussed in relation to FIGS. 9-10 could be used to perform one or more of the actions in FIGS. 6 and 8.

Figure 8:
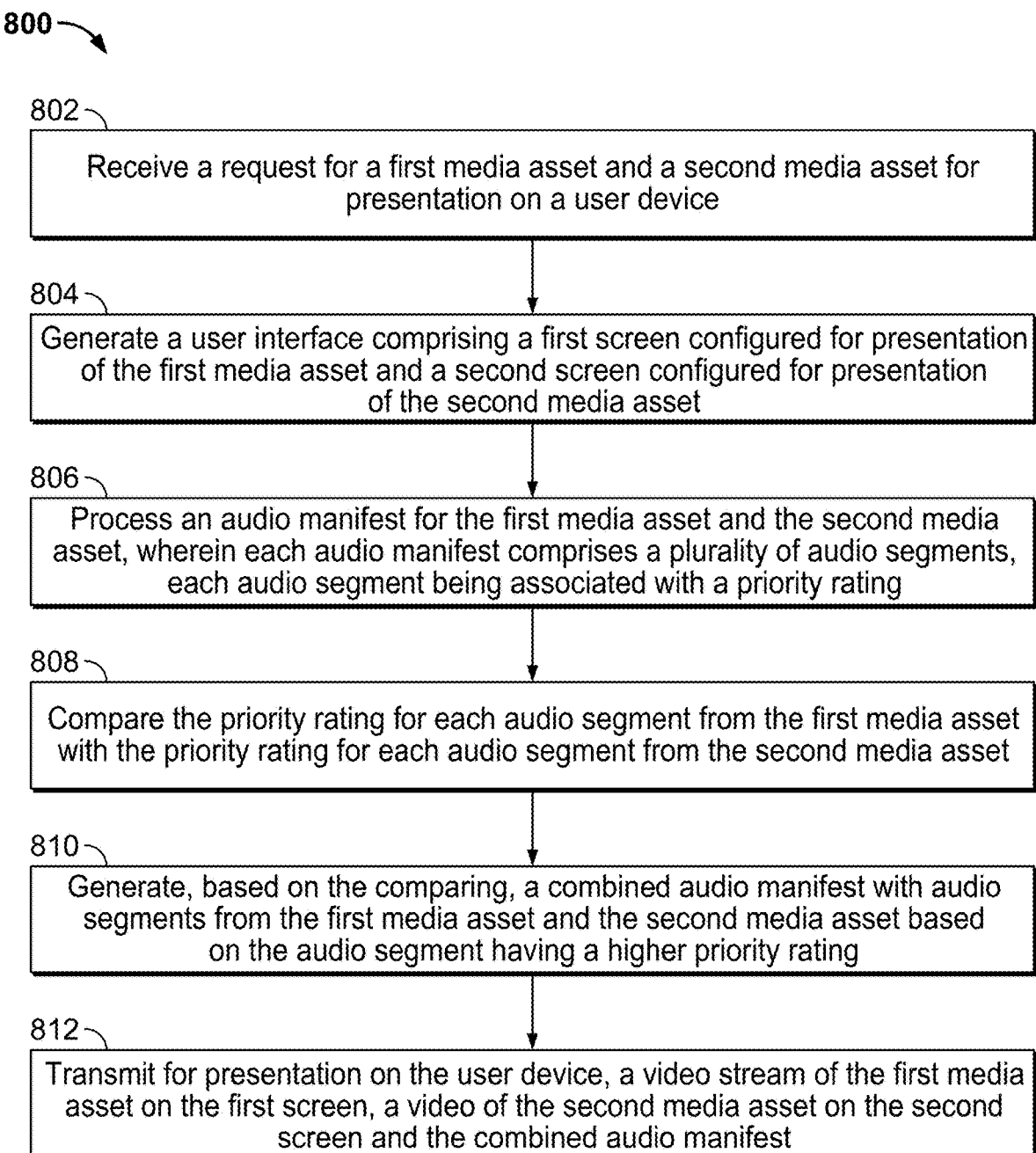
FIG. 8 depicts a flowchart of an illustrative process in which multiple audio segments are combined from a plurality of media assets, in accordance with some embodiments of the disclosure.

FIG. 8 is a flowchart representing an illustrative process for generating multiple media assets for presentation on a single user device. The flowchart in FIG. 8 represents a process 800 implemented on control circuitry 904 to generate multiple media assets for presentation on a single user device with a combined audio segment. It should be noted that process 800 or any action thereof could be performed on, or provided by, any of the devices shown in FIGS. 9-10. For example, process 800 may be executed by control circuitry 904 (FIG. 9) as instructed by a media guidance application implemented on a user device (e.g., user equipment devices 1002, 1004, and/or 1006 (FIG. 10) discussed in more detail below) in order to generate multiple media assets for presentation on a single user device with a combined audio segment.

At 802, control circuitry 904 may receive a request for a first media asset and a second media asset for presentation on a user device. For example, control circuitry 904 may receive a selection to view two different media assets (e.g., football games, Olympic events). For example, control circuitry 904 may receive, via I/O path 902, a first media asset and a second media asset. Control circuitry 904 may process the media assets and generate video and audio signals for output via display 912 and speakers 914, respectively.

At 804, control circuitry 904 may be configured to generate a user interface comprising a first screen configured for presentation of the first media asset and a second screen configured for the presentation of the second media asset. For example, control circuitry 904 may process the media assets and generate the first video and second video for output via display on the user device 400 and process the audio signals 412 for output via speakers 414, respectively.

At 806, control circuitry 904 may be configured to process an audio manifest for the first media asset and the second media asset. Each audio manifest comprises a plurality of audio segments, each audio segment being associated with a priority rating. For example, the control circuitry may evaluate the media assets to identify segments that may be broken up (e.g., by a commercial, change in subject matter, or change in tone). Control circuitry 904 may use the data relating to past media assets to parse the audio stream of the first media asset into the segments. Similarly, control circuitry 904 may use the data relating to past media assets to parse the audio stream of the second media asset into the segments. In some embodiments, the audio segments are already identified at the client side and include a rating associated with each. For example, an action scene with many thrilling and suspenseful moments may be rated highly compared to a scene with casual walking and dialogue.

At 808, control circuitry 904 may be configured to compare the priority rating for each audio segment from the first media asset with the priority rating for each audio segment from the second media asset. For example, control circuitry 904 may compare the media segments of the two selected media assets playing concurrently. The first media asset is added to the combined audio manifest based on a priority rating for a segment of the first media segment compared to the second media segment.

At 810, control circuitry 904 may be configured to generate, based on the comparing, a combined audio manifest with audio segments from the first media asset and the second media asset based on the audio segment having the higher priority rating. For example, control circuitry 404 may add each audio segment from the comparison with a higher priority rating.

At 812, control circuitry 904 may be configured to transmit for presentation on the user device a video stream of the first media asset on the first screen, a video of the second media asset on the second screen and the combined audio manifest. For example, control circuitry 904 may generate for television the first media asset (Jets football game) and the second media asset (Patriots football game) along with the generated combined audio manifest of both games converted to audio at the user device. As the user is watching both games on the display, in a dual-view mode, the audio bounces back and forth from the Jets game to the Patriots game autonomously with no input from the user, based on the priority ratings received from the client metadata. This way, the user may switch her/his attention to the football game where audio is coming from and is freed from manually switching the channels.

The actions and descriptions of FIG. 8 may be used with any other embodiment of this disclosure. In addition, the actions and descriptions described in relation to FIG. 8 may be done in suitable alternative orders or in parallel to further the purposes of this disclosure. Any of these actions may also be skipped or omitted from the process. Furthermore, it should be noted that any of the devices or equipment discussed in relation to FIGS. 9-10 could be used to perform one or more of the actions in FIGS. 6-7.

Figure 9:
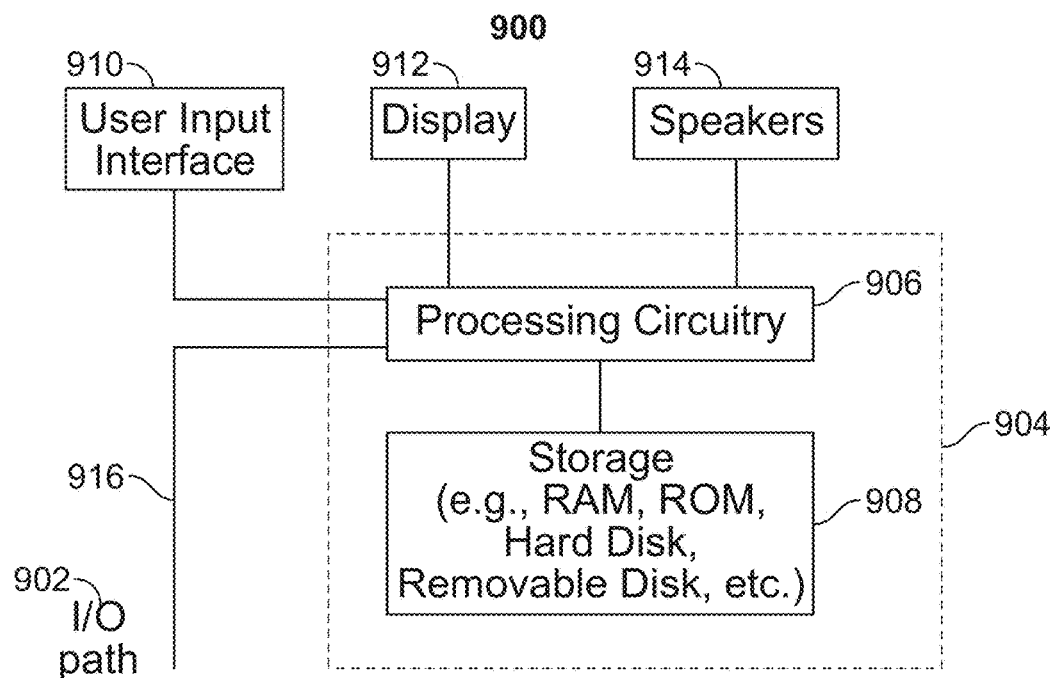
FIG. 9 is a block diagram showing components and data flow therebetween of a system for combining multiple audio sounds from a plurality of media assets, in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client/server-based embodiments, control circuitry 904 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio component may be in the form of a manifest file and may be combined from one or more videos. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client/server-based application. Data for use by a thick or thin client implemented on user equipment device 900 is retrieved on-demand by issuing requests to a server remote to the user equipment device 900. In one example of a client/server-based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
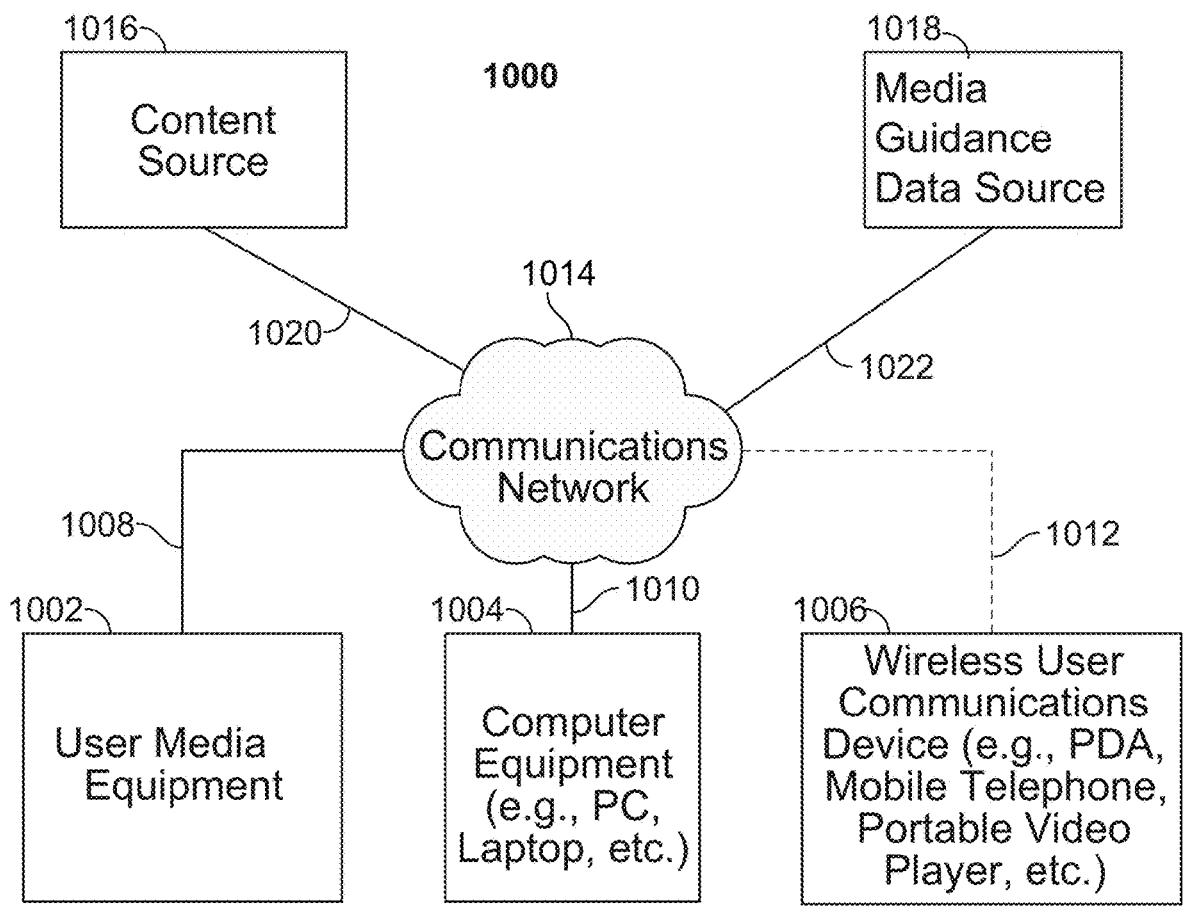
FIG. 10 is a block diagram of an illustrative system for combining multiple audio sounds from a plurality of media assets, in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a website accessed by a web browser. In another example, the guidance application may be scaled down for wireless user communications devices 1006.

In system 1000, there is typically more than one of each type of user equipment device, but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting the settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications networks or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may present on the display multiple media assets, with each media asset having an audio and video stream. In response to requests for two media assets, user equipment devices can communicate via communications network 1014 with a remote server to process the two media assets and generate a combined audio segment for the two media assets. The combined audio segment is generated based on a user preference. The combined media assets include the video for each media asset and a single audio segment that combines the preferred audio segments from each media asset and is transmitted to the user equipment device via communications network 1014. Each of the multiple individuals in a single home may operate different user equipment devices on the home network.

In a second approach, users may have a desire to consume events within multiple media assets. For example, some users may have favorite actors, or scenes that they prefer to see on their device; however, they are already consuming a media asset. The system performs an analysis on the second media asset including performing an object analysis, a frame analysis, a subtitle analysis, a speech analysis and NLP to identify segments of a second media asset that the user prefers to consume. Based on identifying segments from the second media asset, the system accesses metadata of a second media asset to determine the playtime. The system determines a time when the segments will be presented and during the time, the system pauses or switch from generating the first media asset for presentation to generating the identified segment of the second media asset. In some embodiments, the system generates the second media asset in a small window overlaying the first media asset. In some embodiments, the system switched to a dual video presentation, with the second media asset being inserted into the presentation and the first media asset being muted.

In a third approach, a user equipment device receives a request for a first media asset and a second media asset for presentation. The user equipment device generates a user interface where the media assets are presented simultaneously. An audio manifest for each of the media assets is processed to identify audio segments for each audio manifest and based on the audio manifest, the system determines a priority rating for each audio segment. The priority ratings of each audio segment of a first media asset are compared against each audio segment of a second media asset, to identify higher priority rating audio segments. Based on identifying a higher priority rating audio segments, the system generates a combined audio manifest of audio segments that overlap with the higher priority rating audio segments. The system then transmits for presentation on the user device, a video stream of the first media asset on the first screen, a video of the second media asset on the second screen and the combined audio manifest.

In a fourth approach, a user equipment device may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate peer-to-peer without communicating with a central server. The cloud may perform the processing of the media assets such that the audio files are identified and tagged based on the priority ratings. In some embodiments, the audio files are uniquely prepared based on user preferences. For example, a user may select two shows to watch and the system accesses user preference to generate a combined audio stream of audio segments from both media assets. In some aspects, the user wants to hear all commentary when the offense is playing for one team. In another example, the user wants to hear commentary when teams are likely to score in the red zone. This way, as the user is watching two shows, the audio switches back and forth based on the user preferences. In some embodiments, the switching is based on the server-identified priority ratings.

The cloud provides access to services, such as content storage, content sharing, or social networking services, among other examples, as well as access to any content described above, for user equipment devices. Services can be provided in the cloud through cloud computing service providers or through other providers of online services. For example, cloud-based services can include a content storage service, a content-sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations, such as the processing operations performed by processing circuitry described in relation to FIG. 9.

FIG. 11 shows an illustrative diagram of a homogeneous audio combiner exemplary signaling mechanism, in accordance with some embodiments. The homogeneous audio combiner may be used to merge or combine audio segments of two or more channels that are carrying media assets that the user has elected to consume simultaneously. The homogeneous audio combiner is a type of metadata schema. Any metadata schema may be used to describe audio attributes and characteristics of the one or more user equipment devices. The metadata schema may be embedded in a media asset map table ("PMT") or other mechanisms during the multiplexing process where all channel information is multiplexed into a transport stream. In some embodiments, for a typical digital broadcasting context, the metadata schema implemented is a homogeneous audio combiner. Though the homogeneous audio combiner is named "ext_x_independent segments" the metadata schema may be of any alternate name that uniquely maps a channel audio stream for a first media asset and a second media asset for overlapping durations. A focus of this disclosure is directed to broadcast transmission of channels; the same may apply to other forms of content delivery that include but are not limited to IP/Hybrid/OTT ("over the top"). In such instances, the homogeneous audio combiner may take on a suitable format corresponding to the metadata format supported by such transmission mediums. The metadata schema (e.g., homogeneous audio combiner) or its equivalents map a primary audio segment from multiple media assets to one or more combined audio segments. A primary audio segment may be a combination of audio segments from multiple channels to which a subscriber chooses to tune. The homogeneous audio combiner then transmits the file to the user equipment device under a "v9/combinedAudio.m3u" format. In some embodiments, an auxiliary audio segment may be inserted into the combined audio segments in response to not identifying an audio segment that matches a user's preferences.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a web site, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
   providing, for simultaneous display on a device, a first media asset and a second media asset of a plurality of media assets;
   determining a first excitement score for a first segment of the first media asset of the plurality of media assets based on first metadata associated with the first segment;
   determining a second excitement score for a second simultaneous segment of the second media asset of the plurality of media assets based on second metadata associated with the second simultaneous segment, wherein the second simultaneous segment occurs simultaneously with the first segment;
   determining a highest excitement score among the first excitement score for the first segment and the second excitement score for the second simultaneous segment;
   selecting a segment from among the first segment and the second simultaneous segment based on the determined highest excitement score;
   providing, for display on the device, the selected segment, wherein the selected segment is provided for display at an adjusted size.

2. The method of claim 1, wherein the device comprises a dynamic multi-view interface capable of presenting various portions of different live games in a single interface based on an excitement score associated with a given game at that time.

3. The method of claim 1, wherein determining the excitement score for each respective media asset comprises using machine learning algorithms that rely on real-time video processing of live gameplay.

4. The method of claim 1, wherein determining the excitement score for each respective media asset comprises converting a commentator's audio to text and performing natural language processing to assist a predictive engine.

5. The method of claim 1, wherein determining the excitement score for each respective media asset comprises using sentiment analysis on a commentator's audio to determine the commentator's tone and pitch during a particular event.

6. The method of claim 4, wherein the predictive engine is different based on a type of sport.

7. The method of claim 4, wherein the predictive engine relies on historical data and is initially powered by human-labeled scores (training dataset) on a variety of plays and variety of games.

8. The method of claim 1, wherein a dedicated service provides the excitement scores associated with various games, or games of interest to a user, to the device.

9. The method of claim 1, wherein the first media asset is live programming and the second media asset is live programming.

10. The method of claim 1, wherein providing the selected segment for display at the adjust size comprises dynamically expanding the size of the display of the selected segment.

11. A system comprising:
    a memory; and
    control circuitry configured to:
      provide, for simultaneous display on a device, a first media asset and a second media asset of a plurality of media assets, wherein the first media asset and the second media asset are stored in the memory;
      determine a first excitement score for a first segment of the first media asset of the plurality of media assets based on first metadata associated with the first segment;
      determine a second excitement score for a second simultaneous segment of the second media asset of the plurality of media assets based on second metadata associated with the second simultaneous segment, wherein the second simultaneous segment occurs simultaneously with the first segment;
      determine a highest excitement score among the first excitement score for the first segment and the second excitement score for the second simultaneous segment and storing the determined highest excitement score in the memory;
      select a segment from among the first segment and the second simultaneous segment based on the determined highest excitement score;
      provide, for display on the device, the selected segment, wherein the selected segment is provided for display at an adjusted size.

12. The system of claim 11, wherein the device comprises a dynamic multi-view interface capable of presenting various portions of different live games in a single interface based on an excitement score associated with a given game at that time.

13. The system of claim 11, wherein control circuitry is configured to determine the excitement score for each respective media asset by using machine learning algorithms that rely on real-time video processing of live gameplay.

14. The system of claim 11, wherein control circuitry is configured to determine the excitement score for each respective media asset by converting a commentator's audio to text and performing natural language processing to assist a predictive engine.

15. The system of claim 11, wherein control circuitry is configured to determine the excitement score for each respective media asset by using sentiment analysis on a commentator's audio to determine the commentator's tone and pitch during a particular event.

16. The system of claim 14, wherein the predictive engine is different based on a type of sport.

17. The system of claim 14, wherein the predictive engine relies on historical data and is initially powered by human-labeled scores (training dataset) on a variety of plays and variety of games.

18. The system of claim 11, wherein a dedicated service provides the excitement scores associated with various games, or games of interest to a user, to the device.

19. The system of claim 11, wherein the first media asset is live programming and the second media asset is live programming.

20. The system of claim 11, wherein control circuitry is configured to provide the selected segment for display at the adjust size by dynamically expanding the size of the display of the selected segment.

\* \* \* \* \*